United States Patent [19]

Peters et al.

[11] Patent Number: 5,665,128
[45] Date of Patent: Sep. 9, 1997

[54] CLEAN AIR CABINET WITH VALVED EXHAUST

[75] Inventors: Max D. Peters, Plymouth; Gerald D. Peters, Eden Prairie; Teddy Lee Henderson, Robbinsdale, all of Minn.

[73] Assignee: NuAire, Inc., Plymouth, Minn.

[21] Appl. No.: 710,934

[22] Filed: Sep. 24, 1996

Related U.S. Application Data

[63] Continuation of Ser. No. 567,317, Nov. 5, 1995, abandoned.

[51] Int. Cl.[6] .............................................. B01D 35/31
[52] U.S. Cl. ........................... 55/212; 55/311; 55/338; 55/385.2; 55/417; 55/473; 55/DIG. 18; 454/61
[58] Field of Search .................... 55/210, 212, 213, 55/311, 338, 385.2, 416, 417, 473, DIG. 18, DIG. 29; 95/1; 454/56, 61

[56] References Cited

U.S. PATENT DOCUMENTS

| 2,067,434 | 1/1937 | Charipar | 55/212 |
|---|---|---|---|
| 2,189,895 | 2/1940 | Grutzner | 55/210 |
| 3,301,167 | 1/1967 | Howard et al. | 55/DIG. 18 |
| 3,811,250 | 5/1974 | Fowler, Jr. | 55/DIG. 29 |
| 3,895,570 | 7/1975 | Eagleson, Jr. | 55/DIG. 18 |
| 3,899,311 | 8/1975 | Rapp | 55/311 |
| 4,100,847 | 7/1978 | Norton | 55/DIG. 18 |
| 4,102,656 | 7/1978 | Koritz | 55/210 |
| 4,108,238 | 8/1978 | Vary et al. | 55/417 |
| 4,175,934 | 11/1979 | Lang et al. | 55/385.2 |
| 4,202,676 | 5/1980 | Pelosi, Jr. et al. | 55/385.2 |
| 4,249,463 | 2/1981 | Hornby | 55/DIG. 18 |
| 4,832,717 | 5/1989 | Peters | 55/473 |
| 5,344,615 | 9/1994 | Yanagi et al. | 55/385.2 |

FOREIGN PATENT DOCUMENTS

| 52-22883 | 2/1977 | Japan | 55/DIG. 18 |
|---|---|---|---|
| 62-22938 | 1/1987 | Japan | 55/385.2 |

OTHER PUBLICATIONS

NuAire brochure entitled "Labgard425".
Brochure of AppliTek Scientific Instruments entitled "Product Guide".

Primary Examiner—C. Scott Bushey
Attorney, Agent, or Firm—Merchant, Gould, Smith, Edell, Welter & Schmidt, P.A.

[57] ABSTRACT

A clean air cabinet includes a blower chamber and a sample chamber separated by a filter. A blower within the blower chamber forces air through the filter into the sample chamber. A perforated wall between the sample chamber and the filter provides a pressurized zone between the wall and the filter. An exhaust plenum connects the pressurized zone with an exterior of the cabinet. A cap is provided to close off the plenum when the blower is not operating.

9 Claims, 2 Drawing Sheets

FIG. 1
FIG. 2
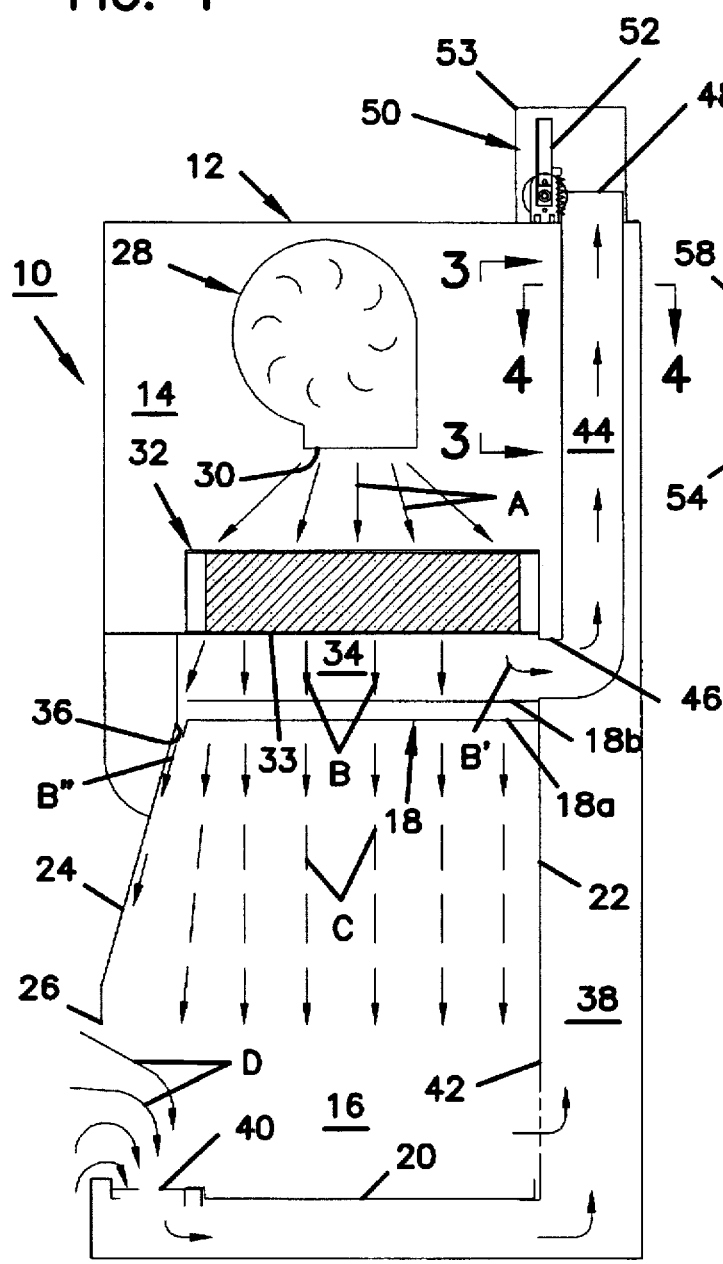
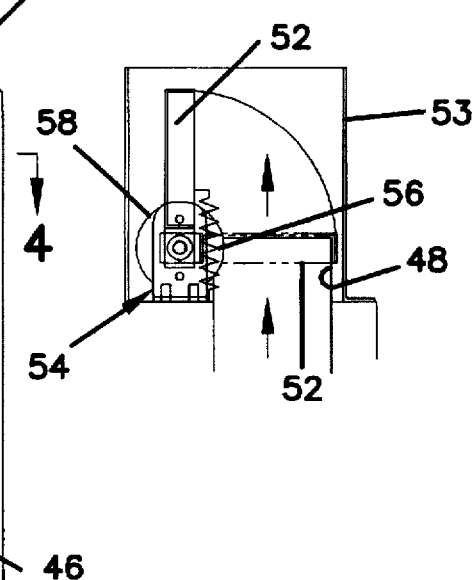

CLEAN AIR CABINET WITH VALVED EXHAUST

This is a continuation of application Ser. No. 08/567,317, filed Nov. 5, 1995 now abandoned.

I. BACKGROUND OF THE INVENTION

1. Field of the Invention

This invention pertains to a clean air cabinet. More particularly, this invention pertains to a clean air cabinet including novel construction for improved compactness, manufacture and performance.

2. Background of the Invention

In the prior art, clean air cabinets are widely used in laboratory environments. Biological safety cabinets are a unique segment of clean air equipment used to protect an operator from contamination with bacteria, virus, chemicals and toxic particulates.

An example of a clean air cabinet is disclosed in commonly assigned U.S. Pat. No. 4,832,717. That patent teaches a clean air cabinet which utilizes two high efficiency particulate air (HEPA) filters. The use of two HEPA filters is common is clean air cabinets. Commonly, one of the HEPA filters is used to filter air being passed from a blower into a work chamber. The second HEPA filter is used to filter air drawn out of the work chamber and passed to the environment.

In the manufacture of clean air cabinets, cost control is very important. The use of two HEPA filters adds significantly to the cost of a cabinet. Further, when a cabinet is not being used and its blower is not operating, contaminants may enter the cabinet. It is desirable to provide a clean air cabinet which is low cost and which avoids contamination during disuse of the cabinet.

II. SUMMARY OF THE INVENTION

According to a preferred embodiment of the present invention, a clean air cabinet is provided which includes a housing which has a blower chamber and a sample chamber. A blower is disposed within the blower chamber. A filter is positioned between the blower and the sample chamber. The blower forces air through the filter and into the sample chamber. The passage of air from the filter to the sample chamber is restricted to provide an increased pressure volume between the filter and the sample chamber. An exhaust plenum connects the increased pressure volume with an exterior of the housing. An air recycling plenum directs airflow from the sample chamber to the blower chamber. A valve is positioned within the exhaust plenum. The valve is movable between a first position for blocking airflow through the exhaust plenum and a second position for permitting airflow through the exhaust plenum. An actuator moves the valve between the first and the second positions.

III. BRIEF DESCRIPTION OF THE DRAWINGS

FIG. 1 is a side elevation view taken in section and showing in schematic format a clean air cabinet according to the present invention;

FIG. 2 is an enlarged portion of the view of FIG. 1 showing a valve mechanism for the present invention in an open position and shown in a closed position in phantom lines;

IV. DESCRIPTION OF THE PREFERRED EMBODIMENT

Figure 3:
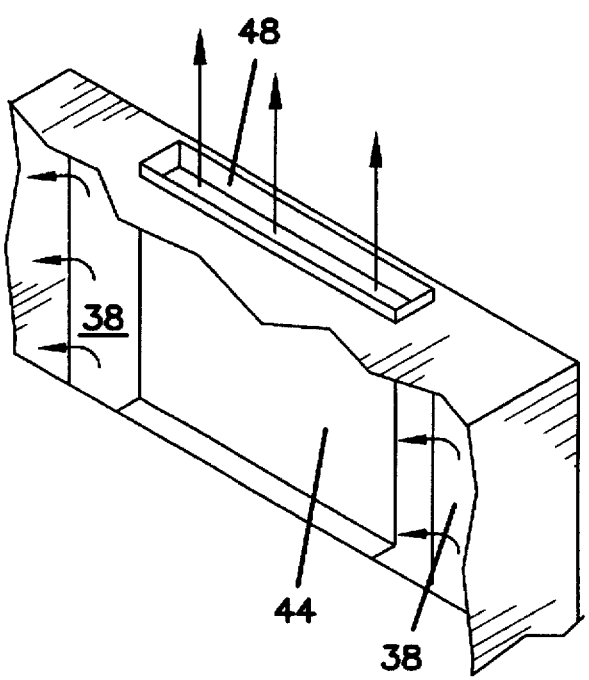
FIG. 3 is a partial sectional view shown in perspective and generally taken along lines 3—3 of FIG. 1.
Figure 4:
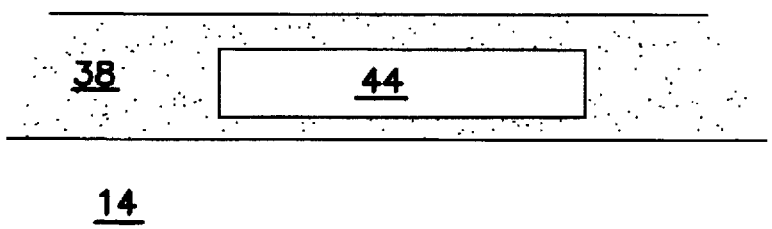
FIG. 4 is a view taken along lines 4—4 of FIG. 1.

Referring now to the several drawing figures in which identical elements are numbered identically throughout, a description of the preferred embodiment of the present invention will now be provided. The present invention is an improvement upon clean air cabinets such as those shown and described in commonly assigned U.S. Pat. No. 4,832,717, incorporated herein by reference.

With initial reference to FIG. 1, the clean air cabinet 10 of the present invention includes a housing 12 divided into an upper blower chamber 14 and a lower sample chamber 16. The sample chamber includes a top wall 18, a bottom wall 20, a rear wall 22, a forward wall 24 and side walls (not shown). The front wall 24 is preferably transparent and has an access opening 26 extending between the lower end of the front wall 24 and the bottom wall 20. In the preferred embodiment, the access opening 26 will extend the entire width of the sample chamber 16. Access opening 26 is about eight inches high to permit a technician or the like to insert arms into the sample chamber 16 and manipulate items which may be contained within the sample chamber 16.

Figure 5:
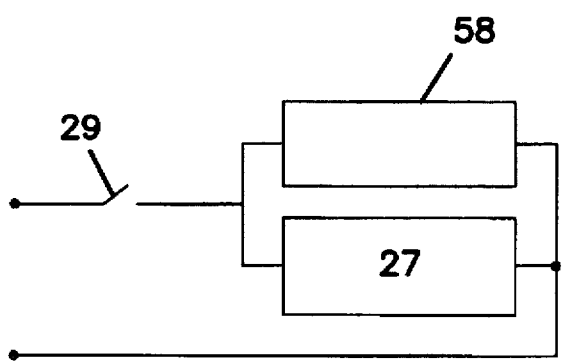
FIG. 5 is an electrical schematic of a circuit for actuating the valve of FIG. 2.

A blower 28 is positioned within the blower chamber 14. The blower 28 has its inlet within chamber 14 to draw air into the blower 28 from chamber 14 when the blower 28 is operated by an electric motor 27 (shown schematically only in FIG. 5) actuated by an operator throwing a switch 29 (shown only in FIG. 5). The outlet 30 of the blower 28 is positioned to direct air through a filter 32 which, in a preferred embodiment, is a high efficiency particulate air (HEPA) filter which has an air discharge surface 33 which is parallel to and spaced from top wall 18.

Air flowing through the filter is directed downwardly through top wall 18 into the sample chamber 16. The top wall 18 is preferably two parallel plates 18a and 18b which are perforated. In a preferred embodiment, plates 18a, 18b are perforated to have holes (not shown) extending through plates 18a, 18b. The holes are about 1/16 inch in diameter and spaced 1/8 inch staggered center. The plates 18a, 18b are separated by about one inch.

The presence of the plates 18a, 18b with the perforated holes provides a restriction to free flow of air from the filter 32 into chamber 16. By reason of this restricted airflow passage, a pressurized volume 34 is defined between the filter 32 and the top wall 18. The top wall 18 extends completely to and is connected to rear wall 22. However, top wall 18 is spaced from the front wall 24 by a spacing 36, the function of which will be described.

Surrounding both the bottom wall 20 and rear wall 22 exterior of chamber 16 is a recycling plenum 38. The recycling plenum 38 communicates with the sample chamber 16 through a first opening 40 in the form of a grill through the floor 20 adjacent the front wall 24. Further, a second opening or grill 42 is formed through the back wall 22 near floor 20, permitting airflow communication between the chamber 16 and the recycle plenum 38. The recycle plenum 38 communicates in free airflow communication with the blower chamber 14 such that recycled air can be drawn from the sample chamber 16 through openings 40, 42 through plenum 38 and recycled to the blower 14 to be drawn into the inlet of the blower 28 as it operates.

An exhaust plenum 44 is provided having an inlet 46 positioned in airflow communication with the pressure zone 34 and with an outlet 48 exterior of the housing 12. A valve 50 is provided in the form of a cap 52 sized to cover outlet 48.

The valve or cap 52 is hinged to the housing 12 by a mounting bracket 54. A spring 56 (shown schematically in FIG. 2) biases the cap 52 to pivot to a down position (shown in phantom lines in FIG. 2) covering the exhaust outlet 48. A rotary solenoid 58 is provided such that upon actuation of the solenoid 58, the cap 52 pivots to the up position shown in FIG. 2 permitting unrestricted airflow out of the exhaust opening 48. An exhaust duct 53 surrounds cap 52 to protect cap 52 and to act as a heat sink for solenoid 58.

As mentioned, the blower 28 is actuated by an electric motor 27 which is connected to a switch 29 activated by an operator as is conventional. The solenoid 58 is connected in parallel with the power for the motor 27 such that the actuator 58 is energized whenever the blower 28 is operating. Accordingly, whenever the blower 28 is operating, the cap 52 is in the open position. Whenever the blower 28 is not operating, the cap 52 is automatically returned to the closed position with the aid of spring 56.

Having thus described the structure of the clean air cabinet 10, the operation of the clean air cabinet 10 can best be understood with reference to FIG. 1. The blower 28 forces air at high velocity out of the outlet 30 and towards the HEPA filter as indicated by airflow lines A. The air flows out of the filter 32 as indicated by airflow lines B toward the top wall 18. As it passes through the filter 32, the air is cleansed of bacteria, viruses and toxic particulate matter and other contaminants.

The filtered airflow B is restricted by reason of top wall 18 to create a high pressurized area 34. A portion of the flow (indicated by line B') passes through the inlet 46 of exhaust plenum 44 and is exhausted through the outlet 48. Also, a portion B" passes through the space 36 and travels along the interior surface of the front wall 24. Since the space 36 is an enlarged space relative to the perforations of wall 18, the airflow B" is about 100 feet per minute. The perforations and spacing of the plates 18a, 18b provide a laminar flow C directed downwardly from wall 18 at a velocity of about 60 feet per minute.

The operation of the fan or blower 28 causing airflow B' to flow out of the exhaust plenum 44 results in a suction within plenum 38. The suction causes ambient air to flow as indicated at lines D through the access opening 26 and into grill 40. Further, remaining flow within chamber 16 passes through openings 40,42 into the recycle plenum 38.

The flow D is preferably at a rate sufficient to ensure contaminants which may be within chamber 16 are not drawn out through access opening 26 (about 90 feet per minute). The desired flow rate is achieved by sizing plenum 44 such that the volume flow rate of air out of exhaust plenum 48 will equal the desired flow rate through access opening 26. The flow B" along wall 24 ensures a wash of air along the wall which provides, in addition to flow D, a curtain of air at access opening 26 to prevent contaminants from exiting chamber 16 through access opening 26.

When the blower 28 is turned off, the solenoid 58 de-energizes and the spring 56 causes the cap 52 to pivot to the closed position shown in phantom lines in FIG. 2. With the cap in the closed position, contaminants in ambient air cannot be drawn into plenum 44. This is necessary by reason of the fact there is only one HEPA filter 32 in the present design and the exhaust plenum 44 and the sample chamber 16 are both downstream of the filter 32. If contaminants were to enter the plenum 44, the contaminants could migrate into chamber 16. The cap 52 prevents the entrance of such contaminants into the plenum 44.

With the invention thus described, it will be appreciated by those skilled in the art that modifications and equivalents of the disclosed concepts are possible. It is intended that the scope of the present invention and claims shall include such modifications and equivalents.

What is claimed is:

1. A clean air cabinet comprising;
   a housing including walls defining a blower chamber and a sample chamber having a front wall, a floor, a top wall and a back wall, said blower chamber disposed vertically above said sample chamber;
   a blower disposed within said blower chamber and having a blower inlet and a blower outlet;
   a filter disposed between said blower and said top wall and cooperating with said top wall to define a volume between said filter and said top wall;
   said blower positioned for air to be forced downwardly from said blower outlet and travel in substantially a straight path through said filter and through said top wall into said sample chamber;
   restricted airflow passages formed through said top wall for restricting airflow through said top wall for said volume to have an elevated pressure relative to said sample chamber and a reduced pressure relative to said blower chamber;
   an exhaust plenum having an exhaust inlet in airflow communication with said volume and an exhaust outlet exterior of said housing;
   an access opening in said front wall;
   an air recycling plenum for directing airflow from said sample chamber to said blower chamber;
   a valve having a first position for blocking airflow through said exhaust plenum and a second position for permitting airflow through said exhaust plenum;
   an actuator for moving said valve between said first and second positions;
   said actuator including means responsive to operation of said blower for automatically moving said valve to said first position when said blower is not operating and for automatically moving said valve to said second position when said blower is operating; and
   said exhaust plenum sized for airflow from said volume through said exhaust plenum to generate a suction at said access opening to draw air from an exterior of said housing through said access opening.

2. A clean air cabinet comprising:
   a housing including walls defining a blower chamber and sample chamber having a front wall, a floor, a top wall and a back wall;
   a blower disposed within said blower chamber and having a blower inlet and a blower outlet;
   a filter disposed between said blower and said top wall;
   said blower positioned for air to be forced from said blower outlet and through said filter and said top wall into said sample chamber;
   said filter spaced from said top wall to define a volume;
   said top wall having restricted airflow passages from said volume to said sample chamber for said volume to have an elevated pressure relative to said sample chamber and a reduced pressure relative to said blower chamber;
   an exhaust plenum having an exhaust inlet in airflow communication with said volume and an exhaust outlet exterior of said housing;

an access opening in said front wall;

an air recycling plenum for directing airflow from said sample chamber to said blower chamber;

a valve having a first position for blocking airflow through said exhaust plenum and a second position for permitting airflow through said exhaust plenum;

an actuator for moving said valve between said first and second positions;

said actuator includes means responsive to operation of said blower for automatically moving said valve to said first position when said blower is not operating and for automatically moving said valve to said second position when said blower is operating; and said exhaust plenum sized for airflow from said volume through said exhaust plenum to generate a suction at said access opening to draw air from an exterior of said housing through said access opening.

3. A clean air cabinet according to claim 2 wherein said means includes a spring for biasing said valve to said first position and a motive member electrically connected to said blower for moving said valve against a bias of said spring when said blower is operating.

4. A clean air cabinet according to claim 3 wherein said valve is a cover sized to cover said exhaust outlet and mounted to move between said first and second positions.

5. A clean air cabinet according to claim 2 wherein said recycle plenum has a first opening through said floor at said front wall and a second opening through said back wall at said floor.

6. A clean air cabinet according to claim 2 wherein said top wall includes at least two parallel spaced apart wall members each having said air flow passages formed therethrough.

7. A clean air cabinet according to claim 2 comprising an air passage connecting said volume with said sample chamber at said front wall and with said passage sized for air to flow at a flow rate faster than a flow rate through said means for restricting airflow.

8. A clean air cabinet according to claim 7 wherein said front wall is sloped downwardly from said top wall and away from said back wall.

9. A clean air cabinet according to claim 2 wherein said access opening extends substantially an entire width of said sample chamber.

* * * * *

UNITED STATES PATENT AND TRADEMARK OFFICE
CERTIFICATE OF CORRECTION

PATENT NO. : 5,665,128
DATED : SEPTEMBER 9, 1997
INVENTOR(S) : PETERS ET AL.

It is certified that error appears in the above-identified patent and that said Letters Patent is hereby corrected as shown below:

ON THE TITLE PAGE:

Item [63]: "Nov. 5, 1995" should read --Dec. 5, 1995--

Col. 1, line 5: "Nov. 5, 1995" should read --Dec. 5, 1995--

Signed and Sealed this

Twelfth Day of May, 1998

Attest:

BRUCE LEHMAN

*Attesting Officer*     *Commissioner of Patents and Trademarks*